United States Patent [19]

Medley et al.

[11] Patent Number: 4,944,553
[45] Date of Patent: Jul. 31, 1990

[54] VEHICLE REINFORCING STRUCTURE

[75] Inventors: Edward H. Medley, Fraser; Raymond N. Kreucher, Jr., Sterling Heights; Dennis F. Stedman, Ortonville; Thomas R. Downs, Clarkston, all of Mich.

[73] Assignee: Chrysler Corporation, Highland Park, Mich.

[21] Appl. No.: 373,437

[22] Filed: Jun. 30, 1989

[51] Int. Cl.$^5$ .............................................. B62D 27/02
[52] U.S. Cl. ..................................... 296/188; 296/209
[58] Field of Search .................. 296/209 X, 188, 185

[56] References Cited

U.S. PATENT DOCUMENTS

| | | | |
|---|---|---|---|
| 2,662,793 | 12/1953 | Lindsay | 296/185 |
| 2,921,182 | 1/1960 | Barenyi | 296/185 |
| 3,423,122 | 1/1969 | Wessells | 296/185 |
| 3,528,699 | 9/1970 | Wessells et al. | 296/209 |
| 3,765,715 | 10/1973 | Franchini | 296/188 |
| 4,014,587 | 3/1977 | Eggert, Jr. | 296/204 |
| 4,081,197 | 3/1978 | Ackel | 296/204 |
| 4,311,744 | 1/1982 | Watanabe | 296/188 |
| 4,346,930 | 8/1982 | Northey | 296/188 |
| 4,457,555 | 7/1984 | Draper | 296/186 |
| 4,471,992 | 9/1984 | Matsunra | 296/209 |

FOREIGN PATENT DOCUMENTS 18784  1/1989  Japan ................................. 296/209

*Primary Examiner*—Robert R. Song
*Attorney, Agent, or Firm*—Gary L. Newtson

[57] ABSTRACT

The present invention is a reinforcement structure for a vehicle. The vehicle has first and second upwardly extending columns longitudinally spaced from each other and a longitudinally extending beam between the first and second columns. The reinforcement structure includes means forming a longitudinally extending member adapted to be disposed adjacent the beam. The reinforcement structure also includes means for securing the member to the beam and the first and second columns to absorb and dampen bending and torsional loads between the first and second columns.

17 Claims, 2 Drawing Sheets

VEHICLE REINFORCING STRUCTURE

BACKGROUND OF THE INVENTION

1. Field of the Invention

The present invention relates generally to vehicle bodies, and more particularly to, a reinforcing structure for a vehicle body.

2. Description of Related Art

Currently, vehicle manufacturers are producing vehicles of the convertible type having a soft-type closing for the passenger compartment or of the targa type having a detachable roof panel. Typically, this vehicle is first produced with a vehicle body having a rigid roof connected to the front or "A" pillars, middle or "B" pillars, and the back or rear pillars. The rigid roof is then cut or severed from the pillars and removed. Alternatively, the vehicle body may be framed without a roof for the convertible type initially. As a result, some type of reinforcing structure is needed to add sufficient strength to limit body parts of the vehicle from moving relative to each other. Further, some type of reinforcing structure is needed to provide sufficient lateral and torsional stiffness.

Previously, reinforcing structures have been used to strengthen the vehicle body. Typically, these reinforcing structures are secured by fasteners underneath the vehicle body or floor pan. As a result, the reinforcing structures would have parts extending toward the ground, which affected the ground clearance of the vehicle and exposed these parts to corrosion elements.

An alternative reinforcing structure was also used to strengthen the vehicle body and was joined to the floor pan within the passenger compartment. The reinforcing structure included forward and rearward transverse members joined to a central tunnel-like construction or main portion. The main portion had a generally U-shaped cross-section extending generally longitudinally of the vehicle and overlying an existing tunnel structure for absorbing torsional and bending loads of the body parts.

One problem with the above reinforcing structures is that they were secured to the flfloor pan of the vehicle which is undesired. Another problem is that the reinforcing structures have many parts requiring in-plant subassemblies, making it costly to produce and install. A further problem is that the reinforcing structure did not provide sufficient positive means of transmitting torsion and dampening it. Another problem is that the tunnel-like reinforcing structure required unique interior trim/carpets versus similar sedan versions.

It is, therefore, one object of the present invention to provide a reinforcing structure which has fewer subassemblies.

It is another object of the present invention to provide a reinforcing structure which adds sufficient strength to limit body parts of the vehicle from moving relative to each other.

It is yet another object of the present invention to provide a reinforcing structure which provides sufficient lateral and torsional stiffness.

It is still another object of the present invention to provide a reinforcing structure which is less costly to manufacture and install.

It is a further object of the present invention to eliminate the need of securing the reinforcing structure to the floor pan of the vehicle.

It is yet a further object of the present invention to provide a reinforcing structure which does not affect vehicle ground clearance or is exposed to corrosion elements.

It is a still further object of the present invention to provide more positive means of transmitting torsion and dampening it.

SUMMARY OF THE INVENTION

Accordingly, the present invention provides a reinforcement structure for a vehicle. The vehicle has first and second upwardly extending columns longitudinally spaced from each other and a longitudinally extending beam between the first and second columns. The reinforcement structure includes means forming a longitudinally extending member adapted to be disposed adjacent the beam. The reinforcement structure also includes means for securing the member to the beam and the first and second columns to absorb and dampen bending and torsional loads between the first and second columns.

One advantage of the present invention is that the reinforcing structure is not secured to the floor pan, but is self contained and secured directly to the pillars and door sill. As a result, the present invention provides greater strength and maintains the size and shape of the door opening. Another advantage of the present invention is that it incorporates a front jacking structure integral with the tube assembly. Yet another advantage of the present invention is that it is contained in a sill recess, eliminating parts which affect vehicle ground clearance or are exposed to corrosion elements. Still! yet another advantage of the present invention is that the interior trim/carpets are the same for the sedan and convertible versions by eliminating the tunnel-like construction. A further advantage of the present invention is that it has fewer subassemblies. A still further advantage of the present invention is that the reinforcing structure is less costly to manufacture and install. Yet, a further advantage of the present invention is that is provides sufficient lateral and torsional stiffness to limit body parts of the vehicle moving relative to each other. Another advantage of the present invention is that the reinforcing structure provides more positive means of transmitting torsion between the body parts and dampening it.

Other advantages of the present invention will be readily appreciated as the same becomes better understood by reference to the following detailed description when considering in connection with the accompanying drawings.

DESCRIPTION OF THE PREFERRED EMBODIMENT

Figure 1:
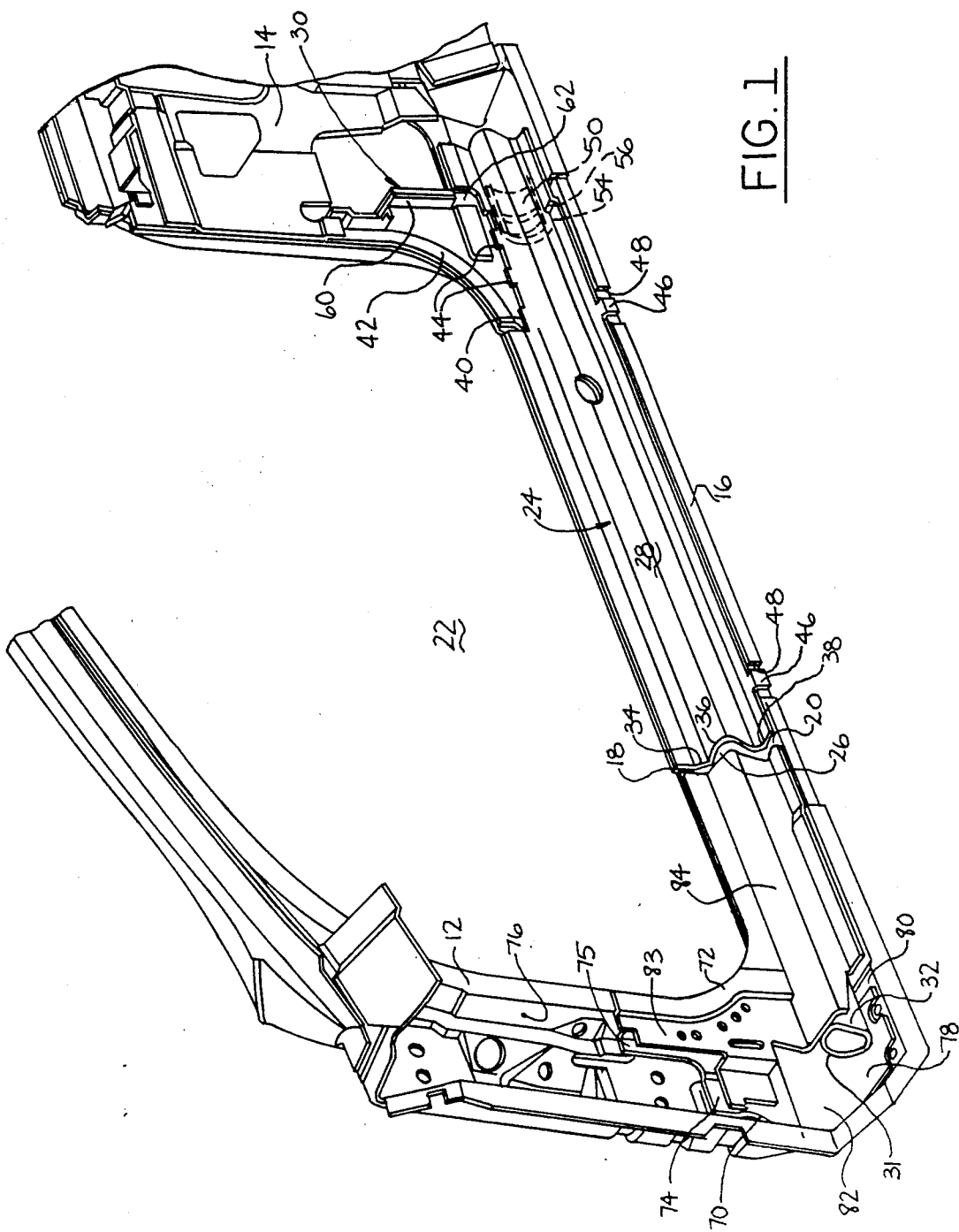
FIG. 1 is a perspective view of a vehicle reinforcing structure constructed in accordance with the principles of the present invention shown in operative relationship to a portion of a vehicle body.
Figure 2:
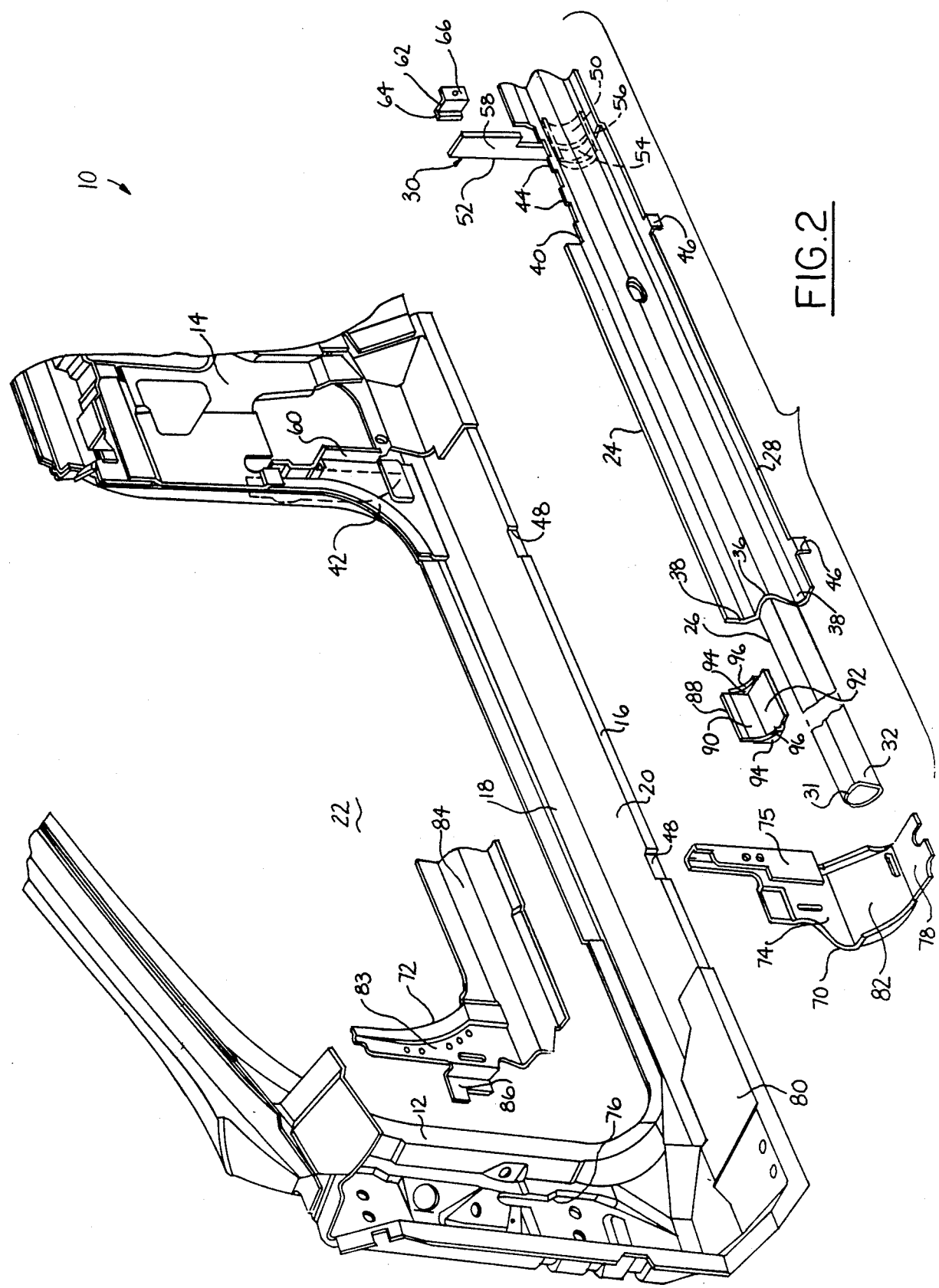
FIG. 2 is an exploded perspective view of the vehicle body and reinforcing structure of FIG. 1 with portions of the reinforcing structure broken away.

Referring to FIGS. 1 and 2, a vehicle body 10 is generally shown for an automotive vehicle. The body 10 includes a first upwardly extending column or "A" pillar 12 near the forward end and a second upwardly extending column or "B" pillar 14 near the rearward end. The body 10 also includes a longitudinally extending beam or door sill 16 interconnecting the A and B pillars 12 and 14 at their lower ends. The door sill 18 comprises a generally vertically and upwardly extending first wall 18 and a generally horizontally extending and inwardly extending second wall 20. The A pillar 12, B pillar 14 and first wall 18 form a generally rectangular opening 22 for a door (not shown).

The present invention comprises a reinforcement structure, generally indicated at 24, for the door area of the vehicle body 10. The reinforcement structure 24 absorbs torsional and bending loads of vehicle body parts (not shown) attached or operatively connected to the A pillar 12 and B pillar 14. Said another way, the A pillar 12 and B pillar 14 move relative to each other due to torsional and bending loads which are absorbed and dampened by the reinforcement structure 24.

The reinforcement structure 24 includes a sill tube 26, a carrier or support member 28, and a brace assembly, generally indicated at 30. The sill tube 26 is a generally longitudinally extending tube having a cross-section which includes an arcuate portion 81 and a planar or flat portion S2 extending longitudinally therealong. Preferably, the sill tube 28 is a heavy gauge material such as steel and having a wall thickness of approximately 0.125 inches. The sill tube 28 is adapted to be disposed adjacent at least one of the first and second walls 18 and 20, respectively.

The support member 28 is a generally longitudinally extending plate adapted to secure the sill tube 26 between the door sill 10 and the support member 28. The support member 28 includes a generally vertically and upwardly extending upper portion S4 connected to a generally arcuate mid portion 36. The support member 28 also includes a generally horizontally and inwardly extending lower portion 38 connected to the mid portion 36. Preferably, the upper portion 34, mid portion, and lower portion 38 are integrally formed. The support member 28 is secured to the sill tube 26 by fastening means such as welding of the mid portion 36 to the sill tube 20. It should be appreciated that the mid portion 36 conforms to the arcuate surface 81 and flat portion 32 of the sill tube 26 It should also be appreciated that the support member 28 is secured to the door sill 16 by means such as welding of the upper portion 34 to the first wall 18 and the lower portion 38 to the second wall 20. It should further be appreciated that any suitable means may be used to secure the support member 28 to the sill tube 28 and door sill 16.

The support member 28 includes a cut-out or recessed portion 40 formed in the upper portion 34 near the rearward end thereof. The recessed portion 40 provides a relief for an L-shaped brace 42 joined between the B pillar 14 and first wall 18 of the door sill 16. The recessed portion 40 has downwardly extending and longitudinally spaced teeth 44 which abut and are secured by means such as welding to the L-shaped brace 42.

The support member 28 also includes at least one and preferably a pair of longitudinally spaced integrally formed tab members 48 extending downwardly from the lower portion 38. The tab members 48 are generally rectangular in shape and are disposed in correspondingly shaped recesses 48 in the second wall 20 of the door sill 16. It should be appreciated that the recesses 48 have a depth to allow the tab member 46 to be at least flush or disposed inwardly of the end surface of the second wall 20. It should also be appreciated that the support member 28 and sill tube 28 may be secured together as a subassembly prior to securement to the door sill 16.

The brace assembly 30 secures the ends of the sill tube 26 to the A and B pillars 14 and 16. The brace assembly 80 includes a gusset member 50 secured to the sill tube 26 near the rearward end thereof by means such as welding. The gusset member 50 is generally a semi-circular or arcuate plate conforming to the arcuate portion 31 of the sill tube 26. The brace assembly 30 also includes a generally vertically and upwardly extending torsion arm or plate member 52 secured to the gusset member 50. The torsion arm 52 is generally a "flag" shaped plate having a lower end 54 with a corresponding semi-circular or arcuate interior surface 56 secured by means such as welding to the gusset member 50. The torsion arm 52 has an upper end 58 of an enlarged generally rectangular shape which abuts and is secured by means such as welding to an inwardly extending flange 80 of the B pillar 14.

The brace assembly 30 includes a bracket 62 which is secured to the torsion arm 52 of the support member 28 by means such as welding. The bracket 82 is generally "L" shaped and is used as an attachment for a power quarter window system. It should be appreciated that the bracket 52 is optional and may be eliminated for the particular application.

Referring to FIG. 1, the brace 42 is generally "L" shaped and has a vertically extending U-shaped portion 84 at the rearward end thereof. The flange 80 is part of a vertically extending extension member 85. The brace 42 is secured by means such as welding to the first wall 18 of the door sill 16 and to the lower end of the extension member 65. The upper end of the extension member 65 is secured by means such as welding to an upper reinforcing subassembly 66. The upper reinforcing subassembly 66 includes a downwardly extending member 67 which is secured by means such as welding in a cavity 68 of the B pillar 14. The member 67 is secured to a rearwardly extending extension member 69 which is secured by means such as welding to B pillar 14 and the rearwardly extending vehicle body. It should also be appreciated that the support member 28, gusset member 50, torsion arm 52, brace 42, and extension member 65 secure the rearward end of the sill tube 26 to the B pillar 14.

The brace assembly 30 further includes a forward outer hinge member 70 and an inner hinge member 72 to secure the forward end of the sill tube 26 to the A pillar 12. The outer hinge member 70 has a generally planar upwardly extending vertical portion ? 4 with a U-shaped flange 75 along the rearward edge and is secured within a cavity 78 of the A pillar 12 by means such as welding. The outer hinge member ? 0 has an inwardly extending horizontal portion 78 secured to a pillar hinge 80 interconnecting the lower wall 20 of the door sill 18 and the A pillar 12. The outer hinge member 70 also has an arcuate portion 82 interconnecting the vertical portion 74 and horizontal portion 78. Preferably, the vertical portion 74, arcuate portion 82 and horizontal portion 78 are integrally formed. The outer hinge member 70 is secured to the A pillar 12 and pillar hinge 80 by means such as welding.

The hinge member 72 has an upper portion 83 extending generally vertically upwardly and a lower portion 84 extending generally longitudinally toward the B pillar 14 The lower portion 84 has a cross-section similar to the support member 28. The inner hinge member 72 includes a generally L-shaped bracket portion 86 at the forward end thereof which is secured to the outer hinge member 70 by means such as welding. The upper portion 83 is secured to the A pillar 12 and the lower portion 84 is secured to the sill tube 226 and door sill 16 by means such as welding.

The brace assembly 30 also includes a forward or front jacking support 88 to support the sill tube 26 near the forward end. The jacking support 88 is generally "L" shaped and has a vertical wall 90, horizontal wall 92 and side walls 94 at the longitudinal ends of the vertical and horizontal walls 90 and 92, respectively. The side walls 94 have an arcuate surface 96 at the upper ends which conforms to the outer surface of the arcuate portion 31 of the sill tube 28 to support the sill tube 26 on the jacking support 88. The vertical and horizontal walls 90 and 92 are secured to the first and second walls 18 and 20 of the door sill 16 by means such as welding.

In operation, the sill tube 26 is secured to the A pillar 12, B pillar 14 and door sill 16 by the support member 28 and brace assembly 30. As a result, relative movement between the pillars 12, 14 and the door sill 16 is resisted. Because the sill tube 26 has substantially a circular cross-section, the sill tube 26 transmits torsional loads from the pillars 14, 16 into the sill tube 26 and dampens these loads.

Accordingly, the reinforcement structure 24 provides sufficient strength and stiffness to absorb and dampen the torsional and bending loads between the A and B pillars 12 and 14 and door sill 16. Also, the reinforcement structure provides sufficient lateral and torsional stiffness to limit body parts of the vehicle from moving relative to each other. Further, the reinforcement structure 24 is easier and less costly to manufacture and install.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A reinforcement structure for a vehicle having first and second upwardly extending columns longitudinally spaced from each other and a longitudinally extending beam between the first and second columns, said reinforcement structure comprising:
   means comprising an elongated tubular member forming a longitudinally extending member adapted to be disposed adjacent the beam; and
   means for securing said member to the beam and the first and second columns to absorb and dampen bending and torsional loads between the first and second columns and the beam, said means for securing comprising a support member for sandwiching said tubular member between the beam and said support member, a brace assembly for securing the ends of said tubular member to the first and second columns, and fastening means for fastening means for fastening said support member to said tubular member and beam and said brace assembly to said first and second columns and said tubular member.

2. The reinforcement structure as set forth in claim 1 wherein said support member has an upwardly extending portion adapted to be secured to a first wall of the beam, an inwardly extending portion adapted to be secured to a second wall of the beam, and a mid portion interconnecting said upwardly and inwardly extending portions and adapted to be secured to said tubular member.

3. The reinforcement structure as set forth in claim 2 wherein said mid portion has a shape to matingly engage the outer surface configuration of said tubular member.

4. The reinforcement structure as set forth in claim 3 wherein said brace assembly comprises a gusset member secured to one end of said tubular member, a torsion arm having one end secured to said gusset member and the other end secured to said second column, and at least one hinge member secured to the other end of said tubular member and said first column.

5. The reinforcement structure as set forth in claim 4 wherein said gusset member is an arcuate plate.

6. The reinforcement structure as set forth in claim 5 wherein said torsion arm has a generally rectangular first end secured to a flange of said second column and a second end having an arcuate surface complementary to the outer surface of said gusset member.

7. The reinforcement structure as set forth in claim 6 wherein said brace assembly includes an outer hinge member secured to the first column and beam and an inner hinge member for sandwiching said tubular member between said outer hinge member and said inner hinge member.

8. The reinforcement structure as set forth in claim 7 wherein said fastening means comprises welds.

9. A reinforcement structure for a vehicle body having forward and rearward upwardly extending columns longitudinally spaced from each other and a longitudinally extending beam at a lower end of the forward and rearward columns, said reinforcement structure comprising:
   a longitudinally extending elongated sill tube having an elliptical cross-section adapted to be disposed adjacent the beam; and
   means for securing said sill tube to the beam and the forward and rearward columns to absorb and dampen bending and torsional loads between the forward and rearward columns, said means for securing comprising a support member for sandwiching said sill tube between the beam and said support member, a brace assembly for securing the ends of said sill tube to the forward and rearward columns, and fastening means for securing said support member to said sill tube and beam and said brace assembly to the forward and rearward columns and said sill tube.

10. The reinforcement structure as set forth in claim 9 wherein said support member has an upwardly extending portion adapted to be secured to an upwardly extending first wall of the beam, an inwardly extending portion adapted to be secured to an inwardly extending second wall of the beam, and a mid portion interconnecting said upwardly and inwardly extending portions and adapted to be secured to said sill tube.

11. The reinforcement structure as set forth in claim 10 wherein said sill tube has a longitudinally extending arcuate and planar portion, said mid portion has a shape to matingly engage said arcuate and planar portion of said sill tube.

12. The reinforcement structure as set forth in claim 11 wherein said brace assembly comprises an arcuate plate member secured near the rearward end of said sill tube, a torsion arm having a first end secured to said plate member and extending upwardly to a second end which is secured to said second column, and first and second hinge members secured near the forward end of said sill tube and the forward column.

13. The reinforcement structure as set forth in claim 12 wherein said first end of said torsion arm has an arcuate surface adapted to abut said plate member.

14. The reinforcement structure as set forth in claim 13 wherein said second end of said torsion arm is rectangular and is secured to a flange of the rearward column.

15. The reinforcement structure as set forth in claim 14 wherein said brace assembly includes an outer hinge member secured to the forward column and beam and an inner hinge member for sandwiching said sill tube between said outer hinge member and said inner hinge member.

16. The reinforcement structure as set forth in claim 15 wherein said fastening means comprises welds.

17. A reinforcement structure comprising:
- a vehicle body having forward and rearward upwardly extending columns longitudinally spaced from each other and a longitudinally extending beam at a lower end of said forward and rearward columns;
- a longitudinally extending sill tube adapted to be disposed adjacent said beam;
- means for securing said sill tube to said beam and said forward and rearward columns to absorb and dampen bending and torsional loads between said forward and rearward columns;
- said sill tube comprising an elongated tube having an elliptical cross-section;
- said securing means comprising a support member for sandwiching said sill tube between said beam and said support member, a brace assembly for securing the ends of said sill tube to said forward and rearward columns, and fastening means for securing said support member to said sill tube and beam and said brace assembly to said forward and rearward columns and said sill tube;
- wherein said support member has an upwardly extending portion adapted to be secured to an upwardly extending first wall of said beam, an inwardly extending portion adapted to be secured to an inwardly extending second wall of said beam, and a mid portion interconnecting said upwardly and inwardly extending portions and adapted to be secured to said sill tube;
- wherein said sill tube has a longitudinally extending arcuate and planar portion said mid portion has a shape to matingly engage said arcuate and planar portion of said sill tube;
- said brace assembly comprising an arcuate plate member secured near the rearward end of said sill tube, a torsion arm having a first end secured to said plate member and extending upwardly to a second end which is secured to said rearward column, and first and second hinge member secured to the forward end of said sill tube and said forward column;
- wherein said first end of said torsion arm has an arcuate surface adapted to abut said plate member, and said second end of said torsion arm is rectangular and is secured to a flange of said rearward column; and
- said brace assembly including an outer hinge member secured to said first column and beam, an inner hinge member for sandwiching said sill tube between said outer hinge member and said inner hinge member, and a jacking support secured to said beam for supporting said sill tube in spaced relation to said beam.

* * * * *